United States Patent
Dezael et al.

(10) Patent No.: US 6,627,108 B1
(45) Date of Patent: Sep. 30, 2003

(54) DESULPHURIZING CATALYTIC COMPOSITION AND ITS USE IN REMOVING HYDROGEN SULPHIDE AND SULPHUR DIOXIDE FROM A GAS

(75) Inventors: Claude Dezael, Maisons Laffitte (FR); Fabrice Lecomte, Vincennes (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 19 days.

(21) Appl. No.: 09/688,388

(22) Filed: Oct. 17, 2000

Related U.S. Application Data

(63) Continuation of application No. 08/978,052, filed on Nov. 25, 1997, now abandoned.

(30) Foreign Application Priority Data

Nov. 25, 1996 (FR) .............................. 96 12477

(51) Int. Cl.⁷ .............................. C09K 3/00; C10L 3/00
(52) U.S. Cl. ............... 252/182.11; 423/575; 423/576.4; 423/576.7
(58) Field of Search .............................. 423/575, 576.7, 423/576.4; 502/150, 170; 252/182.11

(56) References Cited

U.S. PATENT DOCUMENTS

| | | | |
|---|---|---|---|
| 2,998,304 A | * 8/1961 | Urban et al. ................ 23/225 |
| 3,598,529 A | * 8/1971 | Deschamps et al. ........ 23/225 R |
| 3,676,356 A | 7/1972 | Roberts et al. ............. 252/192 |
| 3,909,442 A | 9/1975 | Sample, Jr. ............ 252/8.55 B |
| 3,928,548 A | * 12/1975 | Deschamps et al. ........ 423/575 |
| 4,056,606 A | 11/1977 | Germerdonk et al. ........ 423/575 |
| 4,069,302 A | * 1/1978 | Meadow ..................... 423/575 |
| 4,508,692 A | * 4/1985 | Savage et al. .............. 423/228 |
| 4,911,856 A | 3/1990 | Lokkesmoe et al. .......... 252/95 |
| 5,429,684 A | 7/1995 | Osberghaus et al. ............ 134/3 |
| 5,935,547 A | 8/1999 | LeComte et al. ........... 423/575 |
| 5,951,961 A | 9/1999 | Viltard et al. ................ 423/575 |

FOREIGN PATENT DOCUMENTS

| | | | |
|---|---|---|---|
| DE | 1910127 | * 9/1969 | ................ 423/575 |
| DE | 1 910 127 | 9/1969 | ................ 423/575 |
| FR | 2 115 721 | 7/1972 | |
| GB | 1 223 732 | 3/1971 | ............. 423/576.7 |
| GB | 1223732 | * 3/1971 | ............. 423/576.7 |

* cited by examiner

*Primary Examiner*—Margaret Medley
(74) *Attorney, Agent, or Firm*—Millen, White, Zelano & Branigan, P.C.

(57) ABSTRACT

A desulphurizing composition for the treatment of CLAUS plant tail gases, comprises:

an organic solvent A with a boiling point of more than 200° C. at atmospheric pressure;

a catalyst composition B of at least one alkali- or alkaline-earth salt (S) of an organic monoacid or an organic polyacid which has at least one dissociation constant value (pK) in the range 2.2 to 8 such as formic acid, acetic acid, ascorbic acid, fumaric acid, maleic acid, malonic acid, oxalic acid, tartaric acid, benzoic acid, salicyclic acid, and sulphosalicyclic acid; at least one complexing agent (C) such as an alkali or alkaline-earth salt or a ferrous or ferric salt of a mono- or poly-aminocarboxylic acid, citric acid, a sulphocyanide ion, a ferrocyanide ion, a ferricyanide ion, a phosphate ion, a pyrophosphate ion, a fluoride ion and/or a thiosulphate ion; and water (W), in the following proportions by weight:

S=0.1% to 30%;
C=0.001% to 30%;
W=balance.

15 Claims, 1 Drawing Sheet

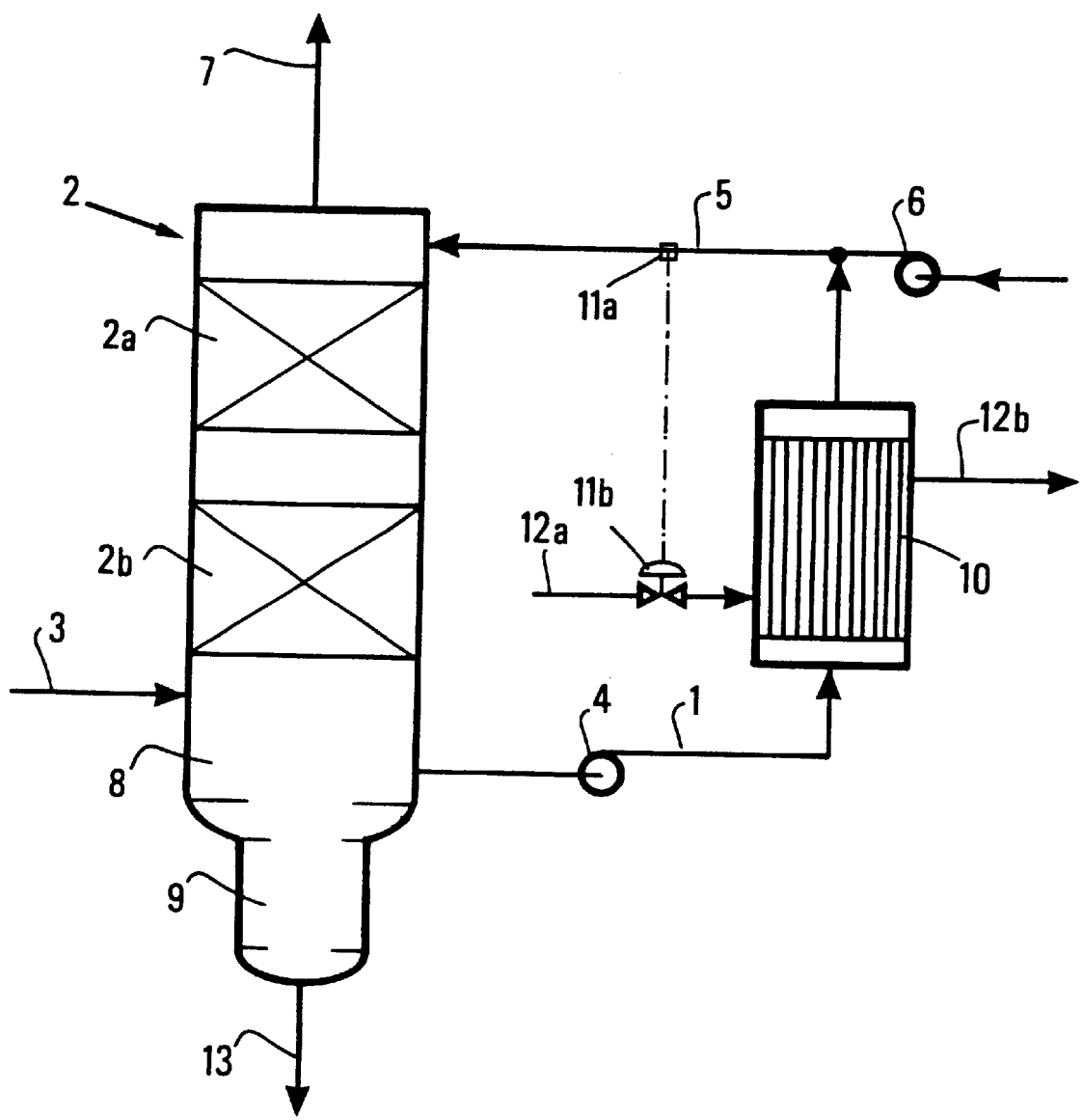

DESULPHURIZING CATALYTIC COMPOSITION AND ITS USE IN REMOVING HYDROGEN SULPHIDE AND SULPHUR DIOXIDE FROM A GAS

This is a continuation of application Ser. No. 08/978,052 filed Nov. 25, 1997, now abandoned.

The present invention concerns a composition, particularly for converting hydrogen sulphide and sulphur dioxide to sulphur, and its use in a process for the treatment of a gaseous effluent containing the composition.

In particular, the invention concerns the treatment of Claus plant tail gases originating from hydrodesulphurization and catalytic cracking units.

The prior art is illustrated in U.S. Pat. Nos. 5,429,684, 4,911,856, 3,676,356, 4,056,606, 2,998,304 and French patent FR-A-2 115 721.

The Claus process is widely used to recover elemental sulphur from gaseous feeds containing hydrogen sulphide ($H_2S$). However, the fumes emitted by Claus plant type units contain non negligible quantities of acid gases, even after several catalytic stages. These tail gases from Claus plants must therefore be treated to eliminate the majority of the toxic compounds in order to satisfy anti-pollution regulations. These regulations are becoming more and more strict and existing technology must be constantly improved upon.

As an example, about 95% by weight of the sulphur can be recovered from a Claus plant; treatment of the Claus plant tail gas (using a Clauspol unit, for example), can, for example, recover 99.8% of the sulphur by using the reaction:

$$2H_2S + SO_2 \cdot 3S + 2H_2O$$

using a reaction medium constituted by an organic solvent and a catalyst comprising an alkali or alkaline-earth salt of an organic acid. The reaction is advantageously carried out in counter-current mode in a reactor-contractor and the temperature is controlled by passing solvent extracted from the lower extremity of the reactor by means of a circulating pump through a heat exchanger to encourage the highest possible degree of conversion of sulphur, while avoiding the formation of solid sulphur. Sulphur is thus recovered in liquid form. While the process is highly effectively, it is limited by various disadvantages linked to the solvent which, over a period of time which varies depending on the quantity of $H_2S$ treated, begins to be oxidised by traces of oxygen contained in the gas.

It has been shown that such oxidation of the solvent causes problems in the operation of the plant:
excessive consumption of catalyst to maintain the catalytic activity of the reaction medium;
poor sulphur decantation;
recovery of poor quality sulphur.

Oxidation appears to be primarily due to traces of oxygen contained in the gas to be treated, but especially due to the presence of trace metals, in particular traces of ferrous or ferric ions, mainly originating from corrosion, which can catalyse the oxidation of the solvent or of the catalytic system.

The invention thus aims to provide a catalytic composition which can overcome these disadvantages and ensure good conversion of $H_2S$ and $SO_2$ to sulphur.

More precisely, the composition comprises:
an organic solvent A with a boiling point of more than 200° C. at atmospheric pressure;
a mixture B of at least one alkali or alkaline-earth salt (S) of an organic monoacid or an organic polyacid which acts as a catalyst, wherein at least one dissociation constant value (pK) is in the range 2.2 to 8; at least one complexing agent (C); and water (W), in the following proportions by weight;
S=0.1% to 30%;
C=0.001% to 30%;
W=qs 100

The alkali ion is preferably selected from the lithium, sodium, potassium or ammonium ion and is advantageously provided in the form of the hydroxide.

In general, an excess of alkali or alkaline-earth ions is used, for example an ion/organic acid ratio which is in the range 1 to 10, preferably in the range 2 to 7.

Advantageously, the catalyst (organic acid salt) has at least one dissociation constant (pK) value in the range 2.6 to 6.

Preferably, the best conversion results are obtained when the catalyst is selected from the group formed by formic acid, acetic acid, ascorbic acid, fumaric acid, maleic acid, malonic acid, oxalic acid, tartaric acid, benzoic acid, salicylic acid and sulphosalicylic acid.

In the steady state, it is used at a concentration of 1% to 5% by weight, preferably 0.5% to 2% by weight with respect to the mixture.

In accordance with the process, the complexing agent is at least one alkaline or alkaline-earth salt or a ferrous or ferric salt of a mono- or poly-aminocarboxylic acid, citric acid, salicylic acid or sulphosalicylic acid, a sulphocyanide ion, a ferrocyanide ion, a ferricyanide ion, a phosphate ion, a pyrophosphate ion, a fluoride ion and/or a thiosulphate ion.

The term "mono- or poly-aminocarboxylic acid" means a nitrogen-containing compound containing 4 to 20 carbon atoms, preferably:
nitrilotriacetic acid, NTA;
ethylene diamine tetraacetic acid, EDTA;
hydroxyethylene diamine tetraacetic acid, HEDTA; and
imidodiacetic acid.

Excellent results have been obtained when the concentrations of complexing agent (or chelating agent) in mixture B are advantageously in the range 0.1% to 5%, preferably in the range 0.01% to 1% by weight.

In a further characteristic of the process, the mixture also contains 0.01% to 10% by weight of at least one anti-oxidant, preferably 0.1% to 2% by weight. Anti-oxidants are generally soluble in the mixture and the organic solvent and are normally selected from propyl gallate, ter-butylhydroquinone, 2,3-534-butyl-4-hydroxyanisole, 3,5-diter-butyl-4-hydroxytoluene, 2,6-di-ter-butyl-4-methylphenol (trade name: Ionol), octyl gallate, 2,4,5,-trihydroxy-butyrophenone, nordihydroguaiaretic acid, 2,6-di-ter-butyl-4-hydroxyrnethylphenol, lauryl gallate, 6-ethoxy-1,2-dihydro-2,2,4-trimethylquinoline (ethoxyquin); and the thiosulphate, chloride formate and oxalate of alkali salts (in particular sodium, potassium and ammonium).

When the anti-oxidant in the composition is organic, its concentration in the mixture is preferably in the range 200 to 1000 ppm by weight; when it is associated with an alkali ion, its concentration is normally higher, for example 0.2% to 1% by weight with respect to the mixture.

In a further characteristic of the process, mixture B can also contain 5 ppm to 1000 ppm of at least one wetting agent which encourages separation of sulphur, preferably 10 to 500 ppm by weight.

The wetting agent or surfactant is advantageously selected from the group formed by sodium dioctylsulphosuccinate, sodium dihexylsulphosuccinate, and sodium diamylsulphosuccinate; more particularly, with a concentration of these products in the range 100 to 200 ppm by weight, excellent results were obtained.

In a further characteristic of the process, it is generally useful to introduce 5 to 10000 ppm by weight of at least one anti-foaming agent, preferably 10 to 500 ppm by weight with respect to mixture B. The most advantageous products can be an alkylene diol-organosilane, for example a product prepared from di-(2-hydroxy-n-propyl) ether and methyltrichlorosilane, or a polyalkylene methylpolysiloxane, or a silicone-glycol copolymer, or an oxyalkylated alcohol.

Solvent A of the composition can be selected from solvents which are insoluble in water or from solvents which are soluble in water, water being one of the products of the reaction of $SO_2$ and $H_2S$:

Of solvents which are insoluble in water, hydrocarbons with boiling points of more than 250° C. at atmospheric pressure are used, preferably dodecane, tridecane, or naphtha with boiling points which are, for example, in the range 225° C. to 335° C.

Of solvents which are soluble in water with boiling points at atmospheric pressure of more than 200° C., polyols containing 3 to 15 carbon atoms are used, preferably glycerol, thiodiglycol and cyclohexane dimethyl ethanol, esters of organic acids containing 5 to 15 carbon atoms, which may be hydroxylated, more particularly trimethyl-pentane-diol-monoisobutyrate and dimethyl-adipate, glycol ethers containing 5 to 15 carbon atoms, advantageously butoxytriglycol, ethoxytriglycol, diethylene glycol butyl ether, ethylene glycol phenyl ether, ter-phenyl ethylene glycol monobenzyl ether, ethylene glycol butyl-phenyl ether, diethylene glycol dibutyl ether, tetra-ethylene glycol dimethyl ether; propylene n-butyl ether, dipropylene n-butyl ether; tripropylene n-butyl ether; diethylene glycol, triethylene glycol and polyethylene glycol with a molecular mass of 200, 300, 400 or 600.

In general in the composition, mixture B represents 0.001% to 10% by weight of solvent A. It is advantageously in a proportion corresponding to a value which is in the range 100 ppm to 5000 ppm, preferably in the range 200 to 1000 ppm (parts per million).

The invention also concerns the use of the composition, in particular in a process for eliminating hydrogen sulphide and sulphur dioxide contained in a gaseous effluent.

The composition is normally used in a proportion of 1% to 40% by volume with respect to the sulphur-containing gaseous effluent, preferably in a proportion of 3% to 30% by volume.

$$\frac{(\text{liquid volume of composition} \times 100)}{(\text{volume of gas} + \text{liquid volume of composition})}$$

It is normally brought into contact with this effluent at a temperature which is in the range 20° C. to 150° C., preferably in the range 60° C. to 130° C.

The advantages of the composition and its use in a process for treating a gaseous effluent containing $H_2S$ and $SO_2$ will become clear from the following examples illustrated by the accompanying FIGURE which shows an implementation of the process in a conventional apparatus.

BRIEF DESCRIPTION OF THE FIGURE

The FIGURE shows an implementation of the process of this invention in a conventional apparatus.

EXAMPLE 1

(FIGURE)

A line (3) introduced a Claus plant gas containing $H_2S$ and $SO_2$ at a rate of 12300 $Nm^3/h$ into a reactor-contactor constituted by a column (2) containing two packing beds (2a and 2b) and was brought into contact with a counter-current of an organic solvent introduced to the head of the reactor via a line (1) and a pump (4). The solvent was recycled between the top and the bottom of the reactor via the line and pump at a rate of 500 $m^3/h$ through a heat exchanger (10) controlled and regulated in temperature by a monitoring and controlling system (11a) and (11b) which can inject hot water via line (12a) and evacuate it via line (12b). The temperature of the recycled solvent was 123° C.

The organic solvent used was a polyethylene glycol with molecular mass 400.

The soluble catalyst, which was continuously injected into the solvent, was constituted by an aqueous solution of sodium salicylate at a concentration of 3% by weight, caustic soda at a concentration of 6.6% by weight and water at a concentration of 90.4% by weight. It was injected into the recirculating line (1) via a line (5) and a pump (6). The average rate of injection of catalyst and water to maintain the desired concentration of catalyst in the solvent was 8.5 l/h.

The packing used in the example was constituted by 2 beds of ceramic "Intalox" saddles with a specific surface area of 250 $m^2/m^3$ which could retain small quantities of sodium salts formed during the reaction.

The treated gas leaving the head of the reactor via a line (7) was sent to an incinerator.

Sulphur was produced in the reactor in accordance with the reaction:

$$2H_2S + SO_2 \cdot 3S + 2H_2O$$

and was separated in a zone (9), while the solvent which was saturated with sulphur at the temperature of the reactor in zone (8) was recycled to the head of the reactor via pump (4).

The sulphur formed was extracted from the bottom of the reactor via a line (13).

The quantities of $H_2S$ and $SO_2$ at the inlet (line 3) and outlet (line 7) of the reactor were determined using the following formula to calculate the reaction yield:

$$\frac{\% \text{ sulphur} - \text{containing compounds at inlet} - \% \text{ sulphur} - \text{containing compounds at outlet}}{(\% \text{ sulphur} - \text{containing compounds at inlet})} \times 100$$

When the unit was first operated, i.e., during the first 3 months of operation and under the conditions defined above, in particular a catalyst injection of 8.5 l/h, the yield of sulphur-containing compounds for the unit was 92.88%.

The sulphur was bright and of very high quality.

After these three months of the trial, while the unit yield was still 92.88%, the colour of the sulphur had changed from bright yellow to light brown, and as time progressed the colour became darker and darker. Analysis using an infra-red spectrophotometric method showed the presence of oxygen-containing products of polyethylene glycol in the solvent. At the solvent-sulphur interface, traces of iron sulphide were found. After operating for more than a year, the sulphur was more difficult to decant due to accumulation of these products.

EXAMPLE 2

In accordance with the invention (catalyst+complexing agent)

The catalytic composition of Example 1 was replaced by a composition of the invention in which mixture B contained:

salicylic acid: 2.7% by weight;

nitrilotriacetic acid: 0.3% by weight;

sodium hydroxide: 6.6% by weight;

water qs 100.

The nitrilotriacetic acid complexing agent was added in a quantity such that that the total quantity of acids (salicylic and nitrilotriacetic) had a catalytic activity which was substantially the same as that of Example 1).

After 3 months of operation, the yield of sulphur-containing compounds, calculated using the formula of Example 1, was 94.5%.

The sulphur was decanted substantially as in Example 1 and the height of the interface was substantially the same.

The sulphur obtained was yellow. Further, no traces of iron sulphide were observed at the interface of the solvent and sulphur.

Analysis of the solvent by infra-red spectrometry did not reveal the presence of oxygen-containing products.

After 6 months operation, the yield of sulphur-containing compounds remained constant, the sulphur recovered was yellow and analysis did not detect oxygen-containing products in the solvent.

EXAMPLE 3

(in accordance with the invention)

The catalytic composition of Example 2 was replaced by the following composition in accordance with the invention, all other conditions being the same as that of Example 1:

salicylic acid: 2.7% by weight;

nitrilotriacetic acid: 0.3% by weight;

sodium hydroxide: 6.6% by weight;

N,N'-di-sec-butylaminophenol: 0.05% by weight;

polyalkylene methylpolysiloxane: 0.01% by weight;

water: qs 100

After three months of operation, the yield of sulphur-containing compounds remained substantially the same as that of Example 2. The sulphur was yellow. The height of the interface in the decantation zone represented about 10% of the height of that corresponding to Example 2.

Analysis of the solvent by infra-red spectrometry indicated that it did not contain oxygen-containing products. The sulphur-solvent interface did not contain iron sulphide.

After 6 months of operation, these results were the same.

EXAMPLE 4

(in accordance with the invention)

The conditions of Example 3 were repeated but the nitrilotriacetic acid was replaced by sodium ferricyanide, in the same proportions by weight. Substantially the same results were obtained as in Example 3.

What is claimed is:

1. A catalytic composition comprising:
    salicylic acid, nitrilotriacetic acid, sodium hydroxide, N,N'-di-sec-butylaminophenol, polyalkylene methylpolysiloxane and water wherein the concentrations are:
    salicylic acid, 2.7% by weight, based on the weight of the composition;
    nitrilotriacetic acid, 0.3% by weight based on the weight of the composition;
    sodium hydroxide, 6.6% by weight, based on the weight of the composition;
    N,N'-di-sec-butylaminophenol, 0.05% by weight, based on the weight of the composition;
    polyalkylene methylpolysiloxane, 0.01% by weight, based on the weight of the composition; and
    water is the balance of the composition.

2. A catalyst composition according to claim 1, further comprising 10–500 ppm by weight of at least one wetting agent.

3. A catalytic composition according to claim 1, further comprising 5 to 1000 ppm by weight of at least one wetting agent.

4. A composition according to claim 3, wherein the wetting agent is sodium dioctylsulphosuccinate, sodium dihexylsulphosuccinate or sodium diamylsulphosuccinate.

5. A composition comprising the catalytic composition of claim 1 and:
    an organic solvent selected from the group consisting of glycerol, thiodiglycol, cyclohexane dimethyl ethanol, trimethyl-pentane-diol-monoisobutyrate, dimethyl-adipate glycol phenyl ether, terphenyl ethylene glycol monobenzyl ether, ethylene glycol butyl-phenyl ether, tetra-ethylene glycol dimethyl ether, propylene n-butyl ether, dipropylene-butyl ether, tripropylene-butyl ether, diethylene glycol, triethylene glycol and polyethylene glycol.

6. A composition comprising the catalytic composition of claim 1 and:
    an organic solvent with a boiling point of more than 200° C. at atmospheric pressure.

7. A composition according to claim 6, wherein the catalytic composition of claim 1 is in a proportion of 0.001% to 10% by weight with respect to the organic solvent.

8. A composition comprising the catalytic composition of claim 1 and:
    an organic solvent which is dodecane, a tridecane, a naphtha, a polyol containing 3 to 15 carbon atoms, an ester of an acid containing 5 to 15 carbon atoms which may be hydroxylated, an ether of a glycol containing 5 to 15 carbon atoms, propylene n-butyl ether, dipropylene n-butyl ether, tripropylene n-butyl ether, diethylene glycol, triethylene glycol or polyethylene glycol with a molecular mass of 200, 300, 400 or 600.

9. A composition according to claim 8, wherein the proportion of the catalytic composition of claim 1 is 0.02% to 0.1% by weight with respect to the organic solvent.

10. A process for eliminating hydrogen sulphide and sulphur dioxide contained in a gaseous effluent, comprising contacting said gaseous effluent with a composition according to claim 6.

11. A process according to claim 10 in which said composition is used in a proportion of 1% to 40% by volume with respect to the sulphur-containing gaseous effluent.

12. A process according to claim 11, wherein the proportion is 3% to 30% by volume.

13. A process according to claim 10, in which said composition is brought into contact with the gaseous effluent at a temperature which is in the range of 20° C. to 150° C.

14. A process according to claim 10, in which the gaseous effluent is a Claus tail gas.

15. A process according to claim 13, wherein the temperature is in the range of 60° to 130° C.

* * * * *